US008514050B1

(12) United States Patent
Miura

(10) Patent No.: US 8,514,050 B1
(45) Date of Patent: Aug. 20, 2013

(54) THERMISTOR AND METHOD FOR MANUFACTURING THE SAME

(71) Applicant: Murata Manufacturing Co., Ltd., Nagaokakyo (JP)

(72) Inventor: Tadamasa Miura, Nagaokakyo (JP)

(73) Assignee: Murata Manufacturing Co., Ltd., Nagaokakyo-Shi, Kyoto-fu (JP)

(*) Notice: Subject to any disclaimer, the term of this patent is extended or adjusted under 35 U.S.C. 154(b) by 0 days.

(21) Appl. No.: 13/858,128

(22) Filed: Apr. 8, 2013

Related U.S. Application Data

(60) Division of application No. 13/404,094, filed on Feb. 24, 2012, which is a continuation of application No. PCT/JP2010/064089, filed on Aug. 20, 2010.

(30) Foreign Application Priority Data

Aug. 28, 2009 (JP) ................................. 2009-198024

(51) Int. Cl.
*H01C 7/10* (2006.01)
(52) U.S. Cl.
USPC .............................. 338/22 R; 338/13; 29/612
(58) Field of Classification Search
USPC .................................................. 338/22 R, 13
See application file for complete search history.

(56) References Cited

U.S. PATENT DOCUMENTS

| 3,219,480 | A | 11/1965 | Girard |
| 3,343,114 | A | 9/1967 | Rice |
| 3,392,054 | A | 7/1968 | Sapoff et al. |
| 3,574,930 | A | 4/1971 | Riddel et al. |
| 4,276,535 | A | 6/1981 | Mitsuyu et al. |
| 5,804,797 | A | 9/1998 | Kaimoto et al. |
| 6,590,491 | B2 | 7/2003 | Hwang et al. |
| 6,794,980 | B2 | 9/2004 | Chu et al. |
| 2007/0242416 | A1 | 10/2007 | Saito et al. |

FOREIGN PATENT DOCUMENTS

| CN | 1123063 A | 5/1996 |
| CN | 101051565 A | 10/2007 |
| JP | 61-242002 A | 10/1986 |
| JP | 61-245502 A | 10/1986 |
| JP | 63-310101 A | 12/1988 |
| JP | 05-090010 A | 4/1993 |
| JP | 06-162843 A | 6/1994 |
| JP | 08-062242 A | 3/1996 |
| JP | 09-260105 A | 10/1997 |
| JP | 11-283803 A | 10/1999 |
| JP | 11-307309 A | 11/1999 |
| JP | 2004-039882 A | 2/2004 |
| JP | 2004-069599 A | 3/2004 |
| JP | 2006-093565 A | 4/2006 |

*Primary Examiner* — Kyung Lee
(74) *Attorney, Agent, or Firm* — Dickstein Shapiro LLP

(57) ABSTRACT

An NTC thermistor having a metal base material, a thermistor film layer formed on the metal base material, and a pair of split electrodes formed on the thermistor film layer. A ceramic slurry is applied onto a carrier film to form the thermistor film layer, a metal powder containing paste is applied onto the thermistor film layer to form the metal base material, and further an electrode paste is applied onto the metal base material to form the split electrodes. Thereafter, the three substances are integrally fired.

5 Claims, 4 Drawing Sheets

THERMISTOR AND METHOD FOR MANUFACTURING THE SAME

CROSS REFERENCE TO RELATED APPLICATIONS

The present application is a divisional of application Ser. No. 13/404,094, filed Feb. 24, 2012, which is a continuation of International application No. PCT/JP2010/064089, filed Aug. 20, 2010, which claims priority to Japanese Patent Application No. 2009-198024, filed Aug. 28, 2009, the entire contents of each of which are incorporated herein by reference.

FIELD OF THE INVENTION

The present invention relates to a thermistor and a method for manufacturing the same, and particularly relates to a thermistor in which a metal base material, a thermistor thin film layer, and an electrode are laminated and a method for manufacturing the same.

BACKGROUND OF THE INVENTION

As an NTC thermistor or a PTC thermistor used as a temperature sensor or the like in a protection circuit heretofore, one disclosed in Patent Document 1 is known. The thermistor has a plate-like metal substrate which also serves as an electrode, a themosensitive resistor film formed on one surface of the plate-like metal substrate, and an electrode film formed on the themosensitive resistor film.

However, since the thermistor has a structure in which the plate-like metal substrate is used as one electrode and the electrode film formed on the top layer is used as another electrode, there is no choice but to use wire bonding for electrical connection to the electrode film. Therefore, it has been impossible to mount the same on a minimal space. For example, when used as a temperature sensor of IC component mounted on a printed-circuit board, there is a 150 to 200 µm minute space between the printed-circuit board and the IC component, and it is preferable to mount the thermistor in the space. However, the mounting by wire bonding does not allow mounting on such a minimal space.

Moreover, the themosensitive resistor film (thermistor thin film) has been formed by a gas phase method, such as sputtering, in the thermistor, which has caused problems of an increase in the cost and poor productivity. Furthermore, the thermistor has had problems that, when cracking or the like occurs in the metal substrate or the themosensitive resistor film, the resistance has fluctuated to change the characteristics as a temperature sensor.

PTL 1: Japanese Unexamined Patent Application Publication No. 61-245502

SUMMARY OF THE INVENTION

It is an object of the present invention to provide a thermistor which can be mounted by reflow and can be mounted on a minimal space and a method for manufacturing the same. It is another object of the invention to provide a thermistor in which a reduction in the height can be achieved and the occurrence of cracking can be suppressed as much as possible and which can be manufactured at a low cost and a method for manufacturing the same.

A thermistor which is a first aspect of the invention has a metal base material, a thermistor thin film layer formed on the metal base material, and a pair of split electrodes formed on the thermistor thin film layer.

In the thermistor, the pair of split electrodes can be soldered by reflow to lands of a printed-circuit board and mounting by wire bonding is not required. Therefore, the thermistor can be mounted even on a minimal space of 200 µm or lower.

In particular, when the thickness of the metal base material is 10 to 80 µm and the thickness of the thermistor thin film layer is 1 to 10 µm, a reduction in the height can be achieved and also flexibility is imparted due to the fact that the thin film thermistor and the metal base material are integrated. Therefore, even when a stress is applied to a thermistor, cracking is hard to occur in a thermistor thin film layer portion. Even when there are irregularities, level differences, and the like in the mounting space, the thermistor described above can be mounted.

Moreover, even when an excessive stress is applied to the thermistor to cause bending, so that cracking occurs in the central part of the thermistor thin film layer, the electrical characteristics as the thermistor are hard to be affected because the thermistor employs split electrodes and the central portion of the thermistor thin film layer is not an energizing path.

A method for manufacturing a thermistor which is a second aspect of the invention is a method for manufacturing a thermistor having a metal base material, a thermistor thin film layer formed on the metal base material, and a pair of split electrodes formed on the thermistor thin film layer, and the method includes a process of applying a ceramic slurry onto a carrier film with a predetermined thickness to form a ceramic green sheet serving as the thermistor thin film layer, a process of applying a metal powder containing paste onto the ceramic green sheet with a predetermined thickness to form a metal base material sheet serving as the metal base material, a process of applying an electrode paste onto a surface of the ceramic green sheet facing the surface, on which the metal base material sheet is formed, with a predetermined thickness to form a split electrode pattern serving as the split electrodes, and a process of integrally firing the metal base material sheet, the ceramic green sheet, and the split electrode pattern.

In the manufacturing method, since the thermistor thin film layer is formed by a solid phase method, the thermistor thin film layer can be manufactured at a lower cost than that of a case where the thermistor thin film layer is manufactured by a gas phase method and also since the metal base material, the thermistor thin film layer, and the split electrodes are integrally fired, the occurrence of cracking in the metal base material or the thermistor thin film layer can be suppressed as much as possible.

According to the present invention, a thermistor can be obtained in which a reduction in the height or mounting by reflow can be achieved and which can be mounted on a minimal space. Moreover, since the thermistor thin film layer is formed by a solid phase method, the thermistor thin film layer can be manufactured at a low cost and the occurrence of cracking can be suppressed as much as possible by integrally firing.

BRIEF DESCRIPTION OF THE DRAWINGS

FIGS. 1(A) and 1(B) illustrate a thermistor which is a first example, in which FIG. 1(A) is a plan view and FIG. 1(B) is a front view.

DETAILED DESCRIPTION OF THE INVENTION

Figure 1A:
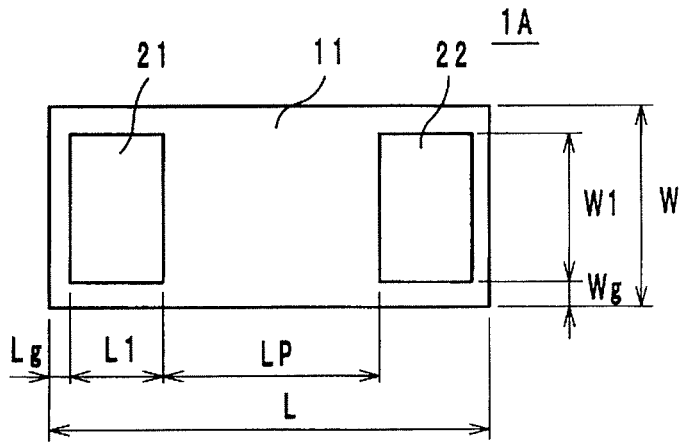

Hereinafter, Examples of a thermistor and a method for manufacturing the same according to the invention are described with reference to the attached drawings. In each drawing, common parts and common portions are designated by the same reference numerals, and the same explanation is omitted.

First Example

Figure 1B:
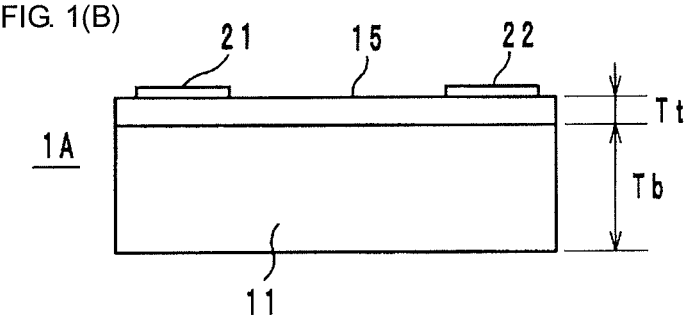
Figure 2:
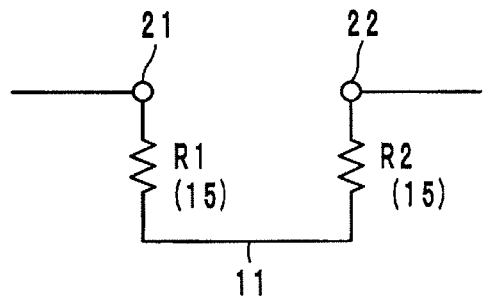
FIG. 2 is an equivalent circuit diagram of the thermistor.
Figure 3:
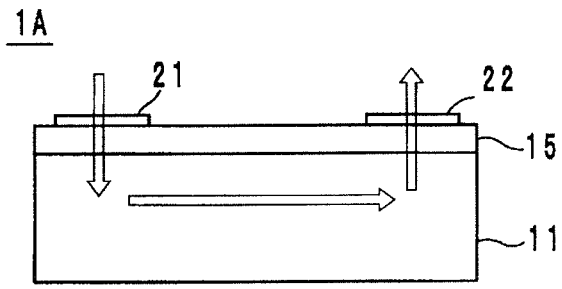
FIG. 3 is an explanatory view for illustrating the energization state of the thermistor.

FIGS. 1 to 3

As illustrated in FIG. 1, an NTC thermistor 1A which is a first example is constituted by a metal base material 11, a thermistor thin film layer 15 formed on the metal base material 11, and a pair of split electrodes 21 and 22 formed on the thermistor thin film layer 15. The metal base material 11 is formed into a sheet shape from a metal powder paste. The thermistor thin film layer 15 is formed into a sheet shape from a ceramic slurry. The split electrodes 21 and 22 are obtained by forming an electrode material paste into a predetermined shape. These three substances are integrally fired. At least the metal base material 11 and the thermistor thin film layer 15 may be fired.

The thickness of the metal base material 11 is about 10 to 80 μm. The thickness of the thermistor thin film layer 15 is about 1 to 10 μm. The thickness of the split electrodes 21 and 22 is about 0.1 to 10 μm. The thickness as the entire thermistor 1A is about 10 to 100 μm. Herein, the entire length size of the thermistor 1A is defined as L, the entire width size thereof is defined as W, the distance between the split electrodes 21 and 22 is defined as Lp, and the short side length, the dimension to the end surface of the thermistor 1A, the long side length, and the dimension to the side surface of the thermistor 1A of the split electrodes 21 and 22 are defined as L1, Lg, W1, and Wg, respectively. The height dimension of the metal base material 11 is defined as Tb and the thickness of the thermistor thin film layer 15 is defined as Tt.

As the thermistor thin film layer 15, various ceramic materials containing Mn, Ni, Fe, Ti, Co, Al, Zn, and the like in an arbitrary combination and in an appropriate amount can be used. In practice, oxides of the transition metal elements mentioned above are mixed for use. However, carbonates, hydroxides, and the like of the elements may be used as a starting material. As the metal base material 11 and the split electrodes 21 and 22, simple substances of precious metals, such as Ag, Pd, Pt, and Au, base metals, such as Cu, Ni, Al, W, and Ti or alloys containing the same can be used.

As a method for forming the metal base material 11 or the thermistor thin film layer 15 into a sheet shape, a doctor blade method is common. However, screen printing, gravure printing, and an ink jet method may be used. The formation of the split electrodes 21 and 22 can be performed by printing methods, such as screen printing, a sputtering method, or a vapor deposition method. Materials and manufacturing processes are described in detail later.

Here, an equivalent circuit of the thermistor 1A is described with reference to FIG. 2. The split electrodes 21 and 22 serve as input/output terminals, and resistances R1 and R2 are formed by the thermistor thin film layer 15 and are electrically connected in series through the metal base material 11. More specifically, the split electrodes 21 and 22 constitute a thermistor circuit through the resistances R1 and R2 formed by the thermistor thin film layer 15 in a direct contact state.

Since the split electrodes 21 and 22 are formed on the surface of the thermistor thin film layer 15, an energization state forms a path passing the thermistor thin film layer 15 of portions contacting the split electrodes 21 and 22 and the metal base material 11 as indicated by the arrow in FIG. 3. In bending or mounting with a mounter of the thermistor 1A, cracking is likely to occur in the central portion of the thermistor thin film layer 15. However, even when cracking occurs in the central portion of the thermistor thin film layer 15, the portion where cracking occurs is not an energization path. Therefore, the electrical characteristics as the thermistor 1A are not affected.

The NTC thermistor 1A having the above-described configuration is used for a temperature sensor of IC component mounted on a printed-circuit board, for example. In this case, the thermistor 1A is mounted by soldering the split electrodes 21 and 22 by reflow onto the lands of the printed-circuit board. Since the height of the thermistor 1A which is the first example is reduced to about 10 to 100 μm, the thermistor 1A can be mounted on an about 150 to 200 μm space formed between the printed-circuit board and the IC component. Due to the fact that the thermistor 1A is mounted on the space, the thermistor 1A can immediately respond to an increase in heat of the IC component as a temperature sensor.

Moreover, due to the fact that the thin film thermistor and the metal base material are integrated, flexibility is imparted. Therefore, even when a stress is applied to the thermistor, cracking is hard to occur in the thermistor thin film layer portion. Even when there are irregularities, level differences, and the like in a mounting space, the thermistor 1A can be mounted.

Manufacturing Process

FIGS. 4(a) to 4(E)

Next, a manufacturing process of the thermistor 1A is described. First, as a raw material of the thermistor thin film layer 15, an Mn—Ni—Fe—Ti oxide was weighed in such a manner as to have a predetermined proportion (in such a manner that the resistivity is 104 Ωcm), sufficiently wet-grounded in a ball mill using a grinding medium, such as zirconia, and thereafter fired at a predetermined temperature, thereby obtaining ceramic powder.

An organic binder was added to the ceramic powder, followed by wet mixing treatment to form a slurry. Then, the obtained slurry was formed into a ceramic green sheet, in which the thickness after firing was 1 to 15 μm, by a doctor blade method. A metal base material paste containing Ag—Pd as the main component was formed into a metal base material sheet, in which the thickness after firing was 5 to 100 μm, on the obtained ceramic green sheet by a doctor blade method. Furthermore, for comparative examination, a 0.5 μm thick thermistor thin film layer was formed by a sputtering method on a 30 μm thick metal base material sheet to be used as a mother sheet for comparative examination. Thereafter, on the ceramic green sheet, an Ag—Pd paste was screen-printed to thereby form split electrodes.

Next, each mother sheet on which the split electrodes were formed was cut into a 1 unit thermistor, accommodated in a zirconia sagger, subjected to debinding treatment, and then fired at a predetermined temperature (e.g., 900 to 1300° C.). Thus, the thermistor 1A of a laminated type having the metal base material 11, the thermistor thin film layer 15, and the split electrodes 21 and 22 was obtained.

Figure 4A:
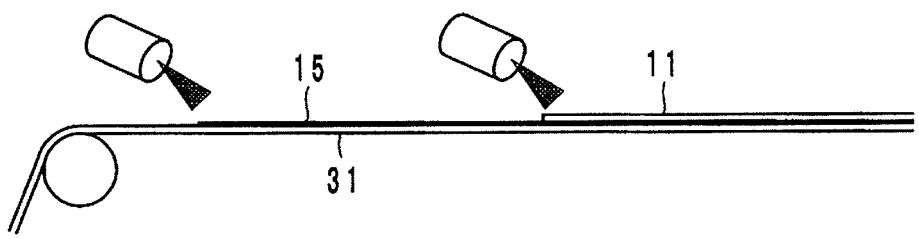
FIGS. 4(A) to 4(E) are explanatory views for illustrating a manufacturing processes of the thermistor.
Figure 4B:
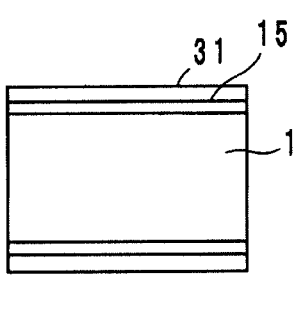
Figure 4C:
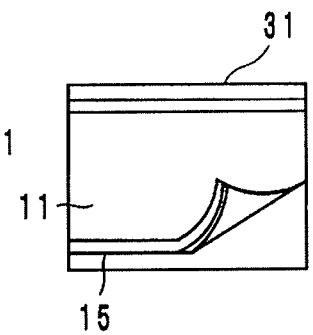
Figure 4D:
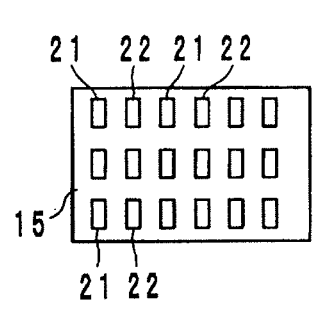
Figure 4E:
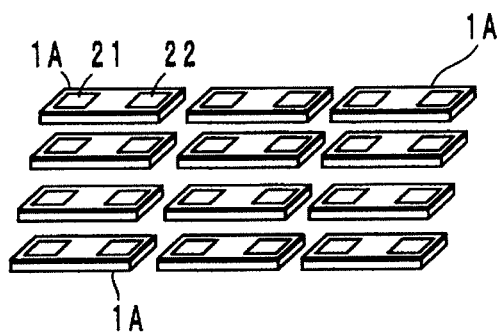

As specific processes, the ceramic slurry was applied onto a PET carrier film 31 to thereby form the ceramic green sheet 15 serving as a thermistor thin film layer by a doctor blade method, and further the metal base material paste was applied thereon to thereby form the metal base material sheet 11 serving as a metal base material by a doctor blade method as illustrated in FIG. 4(A). The film 31 and the sheets 15 and 11 are cut into a dimension for obtaining a multi-piece mother sheet (FIG. 4(B)), and the sheets 15 and 11 are separated from the film 31 (FIG. 4(C)). Thereafter, an Ag—Pd paste is screen-printed onto the sheet 15 to thereby form the split electrodes 21 and 22 (FIG. 4(D)), and then the sheet 15 is cut into a predetermined chip size (FIG. 4(E)). The chip is fired to thereby obtain the laminated type thermistor 1A.

The thermistors obtained in the above-described processes were subjected to various tests described below. Thereafter, the thermistors were observed under an optical microscope, a scanning electron microscope (SEM), and the like for the occurrence of defects (cracking). The room temperature resistance (which refers to the resistance at room temperature of 25° C., the same applies to the following description) was measured before and after the tests, and the occurrence of resistance change in the room temperature resistance by a load test was verified. With respect to the resistance change, it was judged that one in which the change ratio before and after performing the load test is lower than ±1% had no resistance change.

Evaluation Test

First, a winding test was carried out. In the winding test, thermistor test pieces having a length of 500 mm and a width of 5 mm were wound around cylinders having a diameter of 0.71 cm, 1.30 cm, 5.07 cm, and 10.13 cm equivalent to the curvature of the thermistors at a bending length of 1 mm, 2 mm, 8 mm, and 16 mm, and then held for 10 seconds. In the test pieces, the thickness Tb of the metal base material was 30 μm and the thickness Tt of the thermistor thin film layer was 0.5 to 15.0

The test results are as illustrated in Table 1. The evaluation was performed by observing cracking in the surface of the metal base material and measuring the resistance before and after the test. The occurrence of cracking was confirmed by observing the entire surface of the samples under an optical microscope with a magnification of 50 times and 100 times, and further observing the entire surface of the sample under a scanning electron microscope (SEM) with a magnification of 1000 times. In the evaluation column of Table 1, ⊙ represents that cracking was not observed and the resistance change ratio before and after the test was lower than ±1%. ○ represents that cracking was observed but the resistance change ratio before and after the test was lower than ±1%. x represents that cracking was observed and the resistance change ratio before and after the test was ±1% or more.

TABLE 1

| Metal base material thickness Tb (μm) | Thermistor thin film layer thickness Tt (μm) | Diameter of cylinders in winding test (cm) | | | |
|---|---|---|---|---|---|
| | | 0.71 | 1.30 | 5.07 | 10.13 |
| 30 | 0.5 | ⊙ | ⊙ | ⊙ | ⊙ |
| 30 | 1.0 | ⊙ | ⊙ | ⊙ | ⊙ |
| 30 | 2.0 | ⊙ | ⊙ | ⊙ | ⊙ |
| 30 | 3.0 | ○ | ⊙ | ⊙ | ⊙ |
| 30 | 5.0 | x | ○ | ⊙ | ⊙ |
| 30 | 10.0 | x | x | ○ | ⊙ |
| 30 | 15.0 | x | x | x | x |

According to the winding test described above, when the thickness Tt of the thermistor thin film layer is larger than 10 μm, cracking occurs in a test in which the bending length is about 1 mm. When the thickness is lower than 1 μm, the test results can be sufficiently appreciated but it is difficult to form a thermistor thin film layer whose thickness is lower than 1 μm by a solid phase method. A solid phase method is advantageous in terms of a manufacturing cost and productivity. When supposing that a solid phase method is used, the thickness Tt of the thermistor thin film layer is optimally 1.0 to 10 μm.

Thus, by integrating the thin film thermistor and the metal base material, flexibility is imparted to the thermistor. It has been found that, in particular, when the thickness Tt of the thermistor thin film layer is 10 μm or lower, the thermistor has flexibility which allows the thermistor to be wound around a cylinder having a diameter of 10.13 cm. More preferably, when the thickness Tt of the thermistor thin film layer is 2 μm or lower, the thermistor has excellent flexibility which allows the thermistor to be wound around a cylinder having a diameter of 0.71 cm.

Next, a tensile test was carried out. In the tensile test, thermistor test pieces having a length of 50 mm and a width of 5 mm were set in a tensile testing machine (Shimazu Autograph), and the load in cutting was measured. In the test pieces, the width dimension W of the metal base material was 500 μm, the thickness Tb thereof was 5 to 100 μm, and the thickness Tt of the thermistor thin film layer was 3 μm.

The test results are as shown in Table 2. When the thickness Tb of the metal base material is smaller than 10 μm, the tensile strength is remarkably low. For example, when mounted on a printed-circuit board, there is a possibility that the thermistor may be broken due to a solder stress between lands. Moreover, the handling in terms of manufacturing is difficult. When the thickness Tb is larger than 80 μm, the tensile strength is enough but the used amount of the metal materials increases to increase the cost and a reduction in the height of the thermistor is impaired. Therefore, the thickness Tb of the metal base material is preferably 10 to 80 μm. However, the upper limit of the thickness Tb is not necessarily limited in terms of strength.

TABLE 2

| Metal base material width (μm) | Metal base material thickness Tb (μm) | Thermistor thin film layer thickness Tt (μm) | Fracture strength (kgf) |
|---|---|---|---|
| 500 | 5 | 3.0 | 3.8 |
| 500 | 10 | 3.0 | 7.6 |
| 500 | 30 | 3.0 | 22.6 |

TABLE 2-continued

| Metal base material width (μm) | Metal base material thickness Tb (μm) | Thermistor thin film layer thickness Tt (μm) | Fracture strength (kgf) |
|---|---|---|---|
| 500 | 50 | 3.0 | 37.6 |
| 500 | 80 | 3.0 | 60.1 |
| 500 | 100 | 3.0 | 75.1 |

Next, the resistance at room temperature (25° C.) at the distance Lp between the split electrodes was calculated by simulation using FEM (finite element method). The applied voltage in this case was 1 V. The resistance change ratio ΔR/R (%/μm) from the room temperature resistance R in accordance with the change in the distance Lp when the distance Lp between the split electrodes was 2.0 to 200 μm and the thickness Tt of the thermistor thin film layer was changed in the range of 1.0 to 10.0 μm (kΩ) was calculated by the following equation. When the value is larger, the variation in the resistance value is larger. The other numerical values are L=600 μm, W=300 μm, L1=200 μm, W1=260 μm, Tb=30 μm, and Wg=20 μm.

$$\Delta R/R(\%/\mu m) = \{(R1-R2)/R2\}/(Lp1-Lp2)$$

R1: Resistance value when the distance between the split electrodes is Lp1
R2: Resistance value when the distance between the split electrodes is Lp2

Lp1 and Lp2 are continuous and adjacent numerical values in the table and Lp1>Lp2 is established. For example, when Lp1 is 200 μm, Lp2 is 190 μm and when Lp1 is 190 μm, Lp2 is 180 μm. Accordingly, since a comparison target does not exist in the case of the lowest column of the table (Lp is 2.0 μm in Table 3), - is indicated. When a value exceeding 1.00 is obtained in the calculation of ΔR/R (%/μm), ΔR/R (%/μm) becomes larger than 1.00 even when the values of Lp1 and Lp2 are made smaller than the value. Therefore, the experiment is omitted and—is indicated.

The simulation results are as shown in Table 3. It is preferable that the resistance change ratio ΔR/R is lower than ±0.2%. More specifically, the distance Lp is preferably Tt+5 μm or more. When the distance is smaller than Tt+5 μm, the element resistance is affected not only in the thickness direction but in the surface direction. As a result, the contribution to the resistance of the distance Lp becomes large, and the resistance value varies due to processing error. Moreover, when cracking or the like occurs between the split electrodes, the resistance value changes.

TABLE 3

Thermistor dimension
L = 600 μm W = 300 μm L1 = 200 μm W1 = 260 μm Tb = 30 μm

| | R (kΩ) | | | | ΔR/R (%/μm) | | | |
|---|---|---|---|---|---|---|---|---|
| | Tt | | | | | | | |
| Lp (μm) | 1.0 μm | 3.0 μm | 5.0 μm | 10.0 μm | 1.0 μm | 3.0 μm | 5.0 μm | 10.0 μm |
| 200.0 | 3.646 | 10.905 | 18.062 | 35.361 | 0.12 | 0.14 | 0.15 | 0.19 |
| 190.0 | 3.603 | 10.757 | 17.793 | 34.692 | 0.07 | 0.07 | 0.07 | 0.09 |
| 180.0 | 3.577 | 10.686 | 17.676 | 34.379 | 0.02 | 0.02 | 0.03 | 0.06 |
| 170.0 | 3.569 | 10.660 | 17.627 | 34.166 | 0.01 | 0.01 | 0.01 | 0.00 |
| 140.0 | 3.554 | 10.620 | 17.571 | 34.132 | −0.01 | −0.01 | −0.01 | −0.01 |
| 80.0 | 3.568 | 10.656 | 17.628 | 34.235 | 0.01 | 0.01 | 0.01 | 0.01 |
| 50.0 | 3.554 | 10.612 | 17.553 | 34.138 | −0.02 | −0.02 | −0.02 | 0.00 |
| 15.0 | 3.582 | 10.698 | 17.681 | 34.101 | −0.04 | 0.00 | 0.05 | 0.08 |

TABLE 3-continued

Thermistor dimension
L = 600 μm W = 300 μm L1 = 200 μm W1 = 260 μm Tb = 30 μm

| | R (kΩ) | | | | ΔR/R (%/μm) | | | |
|---|---|---|---|---|---|---|---|---|
| | Tt | | | | | | | |
| Lp (μm) | 1.0 μm | 3.0 μm | 5.0 μm | 10.0 μm | 1.0 μm | 3.0 μm | 5.0 μm | 10.0 μm |
| 12.0 | 3.586 | 10.698 | 17.652 | 34.017 | 0.01 | 0.03 | 0.03 | 0.23 |
| 10.0 | 3.585 | 10.693 | 17.643 | 33.861 | 0.00 | 0.05 | 0.09 | 0.27 |
| 9.0 | 3.586 | 10.688 | 17.627 | 33.769 | 0.06 | 0.11 | 0.20 | 0.35 |
| 8.0 | 3.584 | 10.676 | 17.592 | 33.649 | 0.12 | 0.14 | 0.24 | 0.48 |
| 7.0 | 3.579 | 10.660 | 17.551 | 33.487 | 0.13 | 0.21 | 0.29 | 0.64 |
| 6.0 | 3.574 | 10.638 | 17.501 | 33.273 | 0.16 | 0.25 | 0.32 | 0.69 |
| 5.0 | 3.569 | 10.612 | 17.444 | 33.043 | 0.48 | 0.49 | 0.63 | 1.17 |
| 4.0 | 3.552 | 10.559 | 17.335 | 32.657 | 0.70 | 0.70 | 1.04 | — |
| 3.0 | 3.527 | 10.485 | 17.154 | | 1.52 | 1.73 | — | — |
| 2.0 | 3.473 | 10.304 | | | — | — | — | — |

Similarly as above, the end surface distance Lg of the split electrodes was also determined by simulation for the resistance at room temperature (25° C.) The results of calculating the room temperature resistance R (kΩ) and the resistance change ratio ΔR/R (%/μm) when the end surface distance Lg was 0.0 to 20.0 μm and the thickness Tt of the thermistor thin film layer was changed in the range of 1.0 to 10.0 μm are shown in Table 4. The side surface distance Wg is 20 μm and other numerical values are indicated in the margin of Table 4.

TABLE 4

Thermistor dimension L = 600 μm W = 300 μm
L1 = 200 μm W1 = 260 μm Wg = 20 μm Tb = 30 μm

| | R (kΩ) | | | | ΔR/R (%/μm) | | | |
|---|---|---|---|---|---|---|---|---|
| | Tt | | | | | | | |
| Lg (μm) | 1.0 μm | 3.0 μm | 5.0 μm | 10.0 μm | 1.0 μm | 3.0 μm | 5.0 μm | 10.0 μm |
| 0.0 | 3.646 | 10.905 | 18.062 | 35.361 | −0.23 | −0.27 | −0.30 | −0.38 |
| 5.0 | 3.603 | 10.757 | 17.793 | 34.692 | −0.15 | −0.13 | −0.13 | −0.18 |
| 10.0 | 3.577 | 10.686 | 17.676 | 34.379 | −0.04 | −0.05 | −0.06 | −0.12 |
| 15.0 | 3.569 | 10.660 | 17.627 | 34.166 | −0.05 | −0.05 | −0.04 | −0.05 |
| 20.0 | 3.560 | 10.634 | 17.587 | 34.079 | — | — | — | — |

Moreover, the side surface distance Wg of the split electrode resistances was also determined by simulation for the resistance value. The results of calculating the room temperature resistance R (kΩ) and the resistance change ratio L\R/R (%/μm) when the side surface distance Wg was 0.0 to 20.0 μm and the thickness Tt of the thermistor thin film layer was changed in the range of 1.0 to 10.0 μm are shown in Table 5. The end surface distance Lg is 20 μm and other numerical values are indicated in the margin of Table 5.

TABLE 5

Thermistor dimension L = 600 μm W = 300 μm
L1 = (52000/W1) μm W1 = (300 − 2 × Wg) μm
Lg = 20 μm Tb = 30 μm Lp = 560 − 2 × L1

| | R (kΩ) | | | | ΔR/R (%/μm) | | | |
|---|---|---|---|---|---|---|---|---|
| | Tt | | | | | | | |
| Wg (μm) | 1.0 μm | 3.0 μm | 5.0 μm | 10.0 μm | 1.0 μm | 3.0 μm | 5.0 μm | 10.0 μm |
| 0.0 | 3.665 | 10.966 | 18.183 | 35.696 | 0.24 | 0.30 | 0.35 | 0.49 |
| 5.0 | 3.620 | 10.803 | 17.862 | 34.813 | 0.16 | 0.14 | 0.15 | 0.19 |

TABLE 5-continued

Thermistor dimension L = 600 μm W = 300 μm
L1 = (52000/W1) μm W1 = (300 − 2 × Wg) μm
Lg = 20 μm Tb = 30 μm Lp = 560 − 2 × L1

|  | R (kQ) | | | | ΔR/R (%/μm) | | | |
|---|---|---|---|---|---|---|---|---|
|  | Tt | | | | | | | |
| Wg (μm) | 1.0 μm | 3.0 μm | 5.0 μm | 10.0 μm | 1.0 μm | 3.0 μm | 5.0 μm | 10.0 μm |
| 10.0 | 3.590 | 10.725 | 17.725 | 34.475 | 0.08 | 0.08 | 0.08 | 0.11 |
| 20.0 | 3.560 | 10.634 | 17.587 | 34.079 | — | — | — | — |

It is preferable that the resistance change ratio ΔR/R is lower than ±0.2% also about the distance Lg and the distance Wg. More specifically, it is preferable to secure the distance Lg and the distance Wg to be 5 μm or more, and the influence of the resistance change resulting from the surface leak at the end surface and the side surface can be prevented.

Second Example

As a second example, thermistors having the same configuration as that of the first example and having Tb=30 μm, L=600 μm, W=300 μm, L1=200 μm, W1=260 μm, Lg=20 Wg=20 μm, Lp=160 μm, and Tt=5 μm were produced by preparing materials shown in Tables 6 and 7 and by the same manufacturing process as the above-described manufacturing process. The coefficient of linear expansion shown in Tables 6 and 7 are the results of manufacturing a square column having a cross section of 2.0 mm×2.0 mm and a length of 5.0 mm from a material of the metal base material and a material of the thermistor thin film, and measuring the coefficient of linear expansion by TMA in the air atmosphere. The value of the coefficient of linear expansion at 800° C. is indicated on the basis of 30° C. With respect to the measurement conditions, the temperature elevation rate was 10° C./min and a load was 10 gf.

TABLE 6

| Material of metal base material | Coefficient of linear expansion (×10⁻⁵/K) |
|---|---|
| Ag: 100 | 1.93 |
| Ag: 80, Pd: 20 | 1.79 |
| Ag: 70, Pd: 30 | 1.65 |
| Ag: 30, Pd: 70 | 1.49 |
| Pd: 100 | 1.35 |
| Pt: 100 | 0.89 |

TABLE 7

| Material of thermistor thin film | Coefficient of linear expansion (×10⁻⁵/K) |
|---|---|
| Mn—Ni—Al | 0.76 |
| Mn—Ni—Fe | 0.93 |
| Mn—Co—Fe—Al | 1.19 |
| Mn—Co—Fe—Ti | 1.39 |
| Mn—Co—Cu | 1.80 |

The surface of the thermistor after integrally firing was observed under a scanning electron microscope for the occurrence of cracking. The results are shown in Table 8.

TABLE 8

| Coefficient of linear expansion of metal base material (×10⁻⁵/K) | Coefficient of linear expansion of ceramic thin film layer (×10⁻⁵/K) | Coefficient of linear expansion ratio (Base material/ceramic) | Observation of occurrence of cracking after, integrally firing |
|---|---|---|---|
| 1.93 | 0.76 | 2.54 | Occurred |
| 1.79 |  | 2.36 | Occurred |
| 1.65 |  | 2.17 | Not occurred |
| 1.49 |  | 1.96 | Not occurred |
| 1.35 |  | 1.78 | Not occurred |
| 0.89 |  | 1.17 | Not occurred |
| 1.93 | 0.93 | 2.08 | Not occurred |
| 1.79 |  | 1.92 | Not occurred |
| 1.65 |  | 1.77 | Not occurred |
| 1.49 |  | 1.60 | Not occurred |
| 1.35 |  | 1.45 | Not occurred |
| 0.89 |  | 0.96 | Not occurred |
| 1.93 | 1.19 | 1.62 | Not occurred |
| 1.79 |  | 1.50 | Not occurred |
| 1.65 |  | 1.39 | Not occurred |
| 1.49 |  | 1.25 | Not occurred |
| 1.35 |  | 1.13 | Not occurred |
| 0.89 |  | 0.75 | Not occurred |
| 1.93 | 1.39 | 1.39 | Not occurred |
| 1.79 |  | 1.29 | Not occurred |
| 1.65 |  | 1.19 | Not occurred |
| 1.49 |  | 1.07 | Not occurred |
| 1.35 |  | 0.97 | Not occurred |
| 0.89 |  | 0.64 | Occurred |
| 1.93 | 1.80 | 1.07 | Not occurred |
| 1.79 |  | 0.99 | Not occurred |
| 1.65 |  | 0.92 | Not occurred |
| 1.49 |  | 0.83 | Not occurred |
| 1.35 |  | 0.75 | Not occurred |
| 0.89 |  | 0.49 | Occurred |

As is clear from Table 8, by adjusting the coefficient of linear expansion ratio of the material of the metal base material and the material of the thermistor thin film to 0.75 to 2.17, the occurrence of cracking due to a linear expansion difference in integrally firing (particularly in a reduction in temperature after firing) can be suppressed. Since a ceramic material is vulnerable to a tensile stress, cracking is likely to occur when shrunk earlier than the material of the metal base material (when the coefficient of linear expansion of the thermistor thin film material is high). Moreover, by adjusting the coefficient of linear expansion ratio of both materials numerical value in the above-described value range mentioned above, the occurrence of cracking due to thermal stress when the thermistor is mounted on the substrate by reflow can also be suppressed.

Third example

FIG. 5

Figure 5:
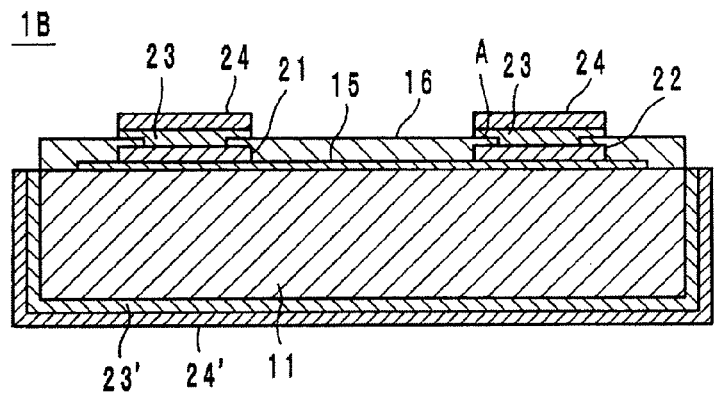
FIG. 5 is a cross sectional view illustrating a thermistor which is a third example.

Similarly as in the first example above, an NTC thermistor 1B which is a third example has the metal base material 11, the thermistor thin film layer 15, and the split electrodes 21 and 22 as illustrated in FIG. 5, and, in addition, a protection layer 16 is formed on the thermistor thin film layer 15 and an Ni plating layer 23 and an Sn plating layer 24 are formed on the split electrodes 21 and 22.

An Ni plating layer 23' and an Sn plating layer 24' are formed also on the surface of the metal base material 11. However, the layers are formed simultaneously with the formation of the plating layers 23 and 24. By these plating layers 23' and 24', an effect of preventing the migration of Ag can be expected when the metal base material 11 is Ag/Pd or the like.

The protection layer 16 is one which suppresses the corrosion of the thermistor thin film layer 15 by plating in the formation of the plating layers 23 and 24 and which may be an insulator material, such as glass, resin, or insulator ceramic, which is not corroded by plating. In particular, when insulator ceramic is used as the protection layer 16, by forming an insulator ceramic green sheet on the thermistor thin film layer 15 beforehand when integrally firing the metal base material 11 and the thermistor thin film layer 15, the metal base material 11, the thermistor thin film layer 15, and the protection layer 16 can be formed by integrally firing, so that the manufacturing process is simplified and the adhesion of the thermistor thin film layer 15 and the protection layer 16 becomes good.

Modification

FIG. 6

Figure 6:
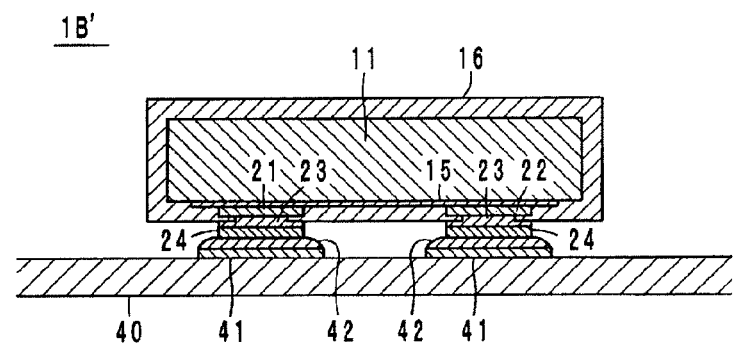
FIG. 6 is a cross sectional view illustrating a modification of the thermistor which is the third example.

A thermistor 1B' illustrated in FIG. 6 is one in which a protection layer 16 is formed also on the back surface or the side surfaces of the metal base material 11, as compared with the thermistor 1B illustrated in FIG. 5. This kind of the thermistor is mounted by reflow on lands 41 formed on the surface of a printed-circuit board 40 through solders 42. In this case, when the metal base material 11 is exposed to the surface, there is a possibility that conductive parts, wiring, and the like which are not illustrated may be electrically conductive to the metal base material 11. Thus, by covering the entire surface of the thermistor except the split electrodes 21 and 22 with the protection layer (insulating layer) 16, such a short circuit accident can be prevented beforehand.

Fourth Example

FIG. 7

Figure 7:
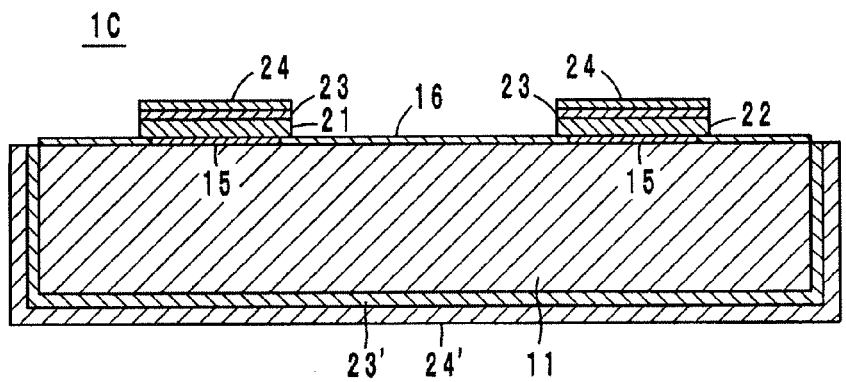
FIG. 7 is a cross sectional view illustrating a thermistor which is a fourth example.

A thermistor 10 which is a fourth example is one in which the thermistor thin film layers 15 are formed immediately under the split electrodes 21 and 22 in a rectangular shape slightly smaller than the split electrodes 21 and 22 as illustrated in FIG. 7. The configuration such that the Ni plating layer 23 and the Sn plating layer 24 are formed on the split electrode 21 and 22 is the same as in the third example.

In the third example (FIG. 5), since the protection layer 16 is formed on the split electrodes 21 and 22, it is surely necessary to laminate the protection layer 16 on the circumference of the split electrodes 21 and 22 in order to completely cover the thermistor thin film layers 15 with the protection layer 16 (Section A of FIG. 5). In this case, the firing condition and the sintering behavior of the protection layer 16 changes in the A section due to a difference of the foundation, which results in a possibility that cracking may occur in the A section. Then, by providing the thermistor thin film layers 15 immediately under the split electrodes 21 and 22 and providing the protection layer 16 on the same plane as the thermistor thin film layer 15 as in the fourth example, the entire foundation of the protection layer 16 is the metal base material 11, so that the presence of the A section which is an overlapped portion is canceled. Therefore, there is no possibility of the occurrence of cracking also disappears and the total thickness as a thermistor becomes small.

Here, in the thermistor 1C which is the fourth example, the results of measuring samples No. 1 to No. 4 shown in Table 9 for the resistance value change resulting from the variation in the area of the split electrodes 21 and 22 are shown. In each of the samples No. 1 to No. 4, the area (L1×W1) of the split electrodes 21 and 22 was set to 310 μm square, 300 μm square, and 290 μm square (three types), the resistivity ρ1 of the thermistor material was 10 kΩcm, and the resistivity ρ2 of the protection layer 16 was set 10 kΩcm in the sample No. 1, 100 kΩcm in the sample No. 2, 1000 kΩm in the sample No. 3, and 10000 kΩ·cm in the sample No. 4. The area of the thermistor thin film layer 15 is 250×250 μm and the thickness (Tt) is 3 μm. L was 1000 μm, W was 500 μm, Tb was 30 μm, Lg was 20 μm, Lp was 960 μm–L direction dimension of the split electrodes (290, 300, or 310 μm), and Wg was 20 μm. ρ1 represents the resistivity of a thermistor material (specifically, Mn—Ni—Fe—Ti thermistor material) formed into the thermistor thin film layer. ρ2 represents the resistivity of an insulator material (specifically, Fe—Mn ferrite material) formed into the protection layer. The resistivity is changed by changing the composition ratio. The resistance value change (%) was calculated by the following equation.

Resistance value change=$(R2-R1)/R1 \times 100$

R1: Element resistance value when the split electrode area is 290 μm.

R2: Element resistance value when the split electrode area is 310 μm.

TABLE 9

| Sample No. 1 | Split electrode area | | |
|---|---|---|---|
| | □310 μm | □300 μm | □290 μm |
| Resistivity of thermistor material (ρ1) | | 10 kΩcm | |
| Resistivity of protection layer (ρ2) | | 10 kΩcm | |
| Resistivity ratio ρ2/ρ1 of thermistor material and protection layer | | 1 | |
| Element resistance (kΩ) | 6.243 | 6.667 | 7.134 |
| Resistance value change (%) | | 14.27 | |

| Sample No. 2 | Split electrode area | | |
|---|---|---|---|
| | □310 μm | □300 μm | □290 μm |
| Resistivity of thermistor material (ρ1) | | 10 kΩcm | |
| Resistivity of protection layer (ρ2) | | 100 kΩcm | |
| Resistivity ratio ρ2/ρ1 of thermistor material and protection layer | | 10 | |
| Element resistance (kΩ) | 9.110 | 9.195 | 9.279 |
| Resistance value change (%) | | 1.86 | |

| Sample No. 3 | Split electrode area | | |
|---|---|---|---|
| | □310 μm | □300 μm | □290 μm |
| Resistivity of thermistor material (ρ1) | | 10 kΩcm | |
| Resistivity of protection layer (ρ2) | | 1000 kΩcm | |
| Resistivity ratio ρ2/ρ1 of thermistor material and protection layer | | 100 | |
| Element resistance (kΩ) | 9.549 | 9.558 | 9.567 |
| Resistance value change (%) | | 0.19 | |

| Sample No. 4 | Split electrode area | | |
|---|---|---|---|
| | □310 μm | □300 μm | □290 μm |
| Resistivity of thermistor material (ρ1) | | 10 kΩcm | |
| Resistivity of protection layer (ρ2) | | 10000 kΩcm | |

TABLE 9-continued

| Resistivity ratio ρ2/ρ1 of thermistor material and protection layer | | 1000 | |
|---|---|---|---|
| Element resistance (kΩ) | 9.595 | 9.596 | 9.597 |
| Resistance value change (%) | | 0.02 | |

As is clear from Table 9, the resistance value change (%) was 14.27 when ρ2/ρ1 was 1 (Sample No. 1), 1.86 when ρ2/ρ1 was 10 (Sample No. 2), 0.19 when ρ2/ρ1 was 100 (Sample No. 3), and 0.02 when ρ2/ρ1 was 1000 (Sample No. 4). When ρ2/ρ1 is 100 times or more, the resistance value change can be suppressed to 0.2% or lower even when the area of the split electrodes 21 and 22 varies. Therefore, the ρ2/ρ1 ratio is preferable.

Fifth Example

FIG. 8

Figure 8:
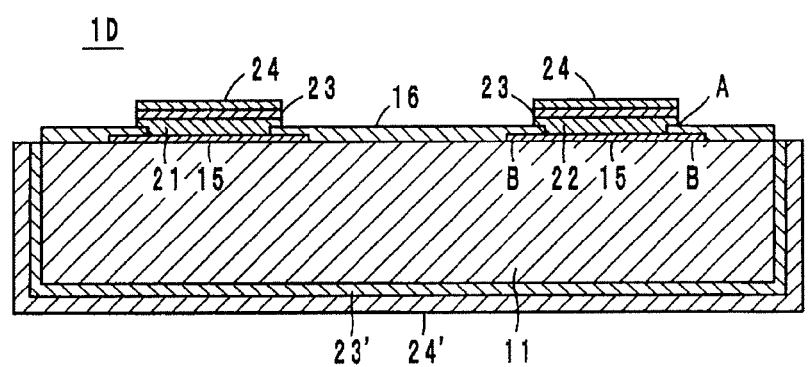
FIG. 8 is a cross sectional view illustrating a thermistor which is a fifth example.

A thermistor 1D which is a fifth example is one in which the area of the thermistor thin film layers 15 is made larger than the area of the split electrodes 21 and 22 as illustrated in FIG. 8. In other words, peripheral portions B of the thermistor thin film layers 15 were located outside to the peripheral portion of the split electrodes 21 and 22 and the protection layer 16 covers a region from the peripheral portions B to a part of the inner side of the thermistor thin film layer 15. The other configurations are the same as those of the fourth example.

In the fifth example, the protection layer 16 covers the peripheral portions B of the thermistor thin film layers 15. Therefore, by bringing the protection layer 16 into close contact with the metal base material 11, the thermistor thin film layers 15 are held, so that the thermistor thin film layers 15 are prevented from separating from the metal base material 11. Supposing that the thermistor thin film layers 15 are separated from the metal base material 11, the area to which the resistance value contributes decreases, so that the resistance value tends to increase. However, the invention is free from the problem. Since the protection layer 16 does not contribute to the thermistor characteristics, a material having high adhesion with the metal base material 11 may be selected.

As in the fifth Example, in a case where the thermistor thin film layers 15 were formed, the protection layer 16 was formed in such a manner that a part thereof is overlapped with the peripheral portions of the thermistor thin film layers 15, and then the split electrodes 21 and 22 were formed, peripheral portions of the protection layer 16 are formed between the peripheral portions at the side of the thermistor thin film layer 15 of the split electrodes 21 and 22 and the thermistor thin film layers 15. In this case, even when cracking occurs between the protection layer 16 and the thermistor thin film layer 15 in the A section of the protection layer 16, so that the plating layers 23 and 24 grow during plating, the split electrodes 21 and 22 and the metal base material 11 do not cause a short circuit because a portion (A section) where cracking may occur is apart from the split electrodes 21 and 22.

Other Examples

The thermistor and the method for manufacturing the same according to the invention are not limited to the Examples above, and can be modified in various manners within the scope thereof.

In particular, various sizes of the thermistor shown in the Examples above are merely examples. Furthermore, the shape and the like of the details of the metal base material, the thermistor thin film layer, and the split electrodes are arbitrary.

As described above, the invention is useful for a thermistor and a method for manufacturing the same and particularly is excellent in that a reduction in the height or mounting by reflow or the like can be achieved, the thermistor can be manufactured at a low cost, and the occurrence of cracking can be suppressed as much as possible.

REFERENCE SIGNS LIST 1A, 1B, and 1B', 1C, 1D Thermistor
11 Metal base material
Thermistor thin film layer
16 Protection layer (insulating layer)
21, 22 Split electrode
31 Carrier film

The invention claimed is:

1. A method for manufacturing a thermistor having a metal base material, a thermistor film layer adjacent the metal base material, and a pair of split electrodes adjacent the thermistor film layer, the method comprising:
    applying a ceramic slurry onto a carrier film with a predetermined thickness to form a ceramic green sheet serving as the thermistor film layer;
    applying a metal powder containing paste onto the ceramic green sheet with a predetermined thickness to form a metal base material sheet serving as the metal base material;
    applying an electrode paste onto a surface of the ceramic green sheet with a predetermined thickness to form a split electrode pattern serving as the split electrodes; and
    integrally firing the metal base material sheet, the ceramic green sheet, and the split electrode pattern.

2. The method for manufacturing a thermistor according to claim 1, wherein a thickness of the metal base material after firing is 10 to 80 μm, and a thickness of the thermistor film layer after firing is 1 to 10 μm.

3. The method for manufacturing a thermistor according to claim 1, wherein when a distance between the split electrodes after firing is defined as Lp and a thickness of the thermistor film layer after firing is defined as Tt, Lp≧Tt+5 μm.

4. The method for manufacturing a thermistor according to claim 1, wherein a distance from an end portion of the split electrodes after firing to an end portion of the thermistor film layer after firing is 5 μm or more.

5. The method for manufacturing a thermistor according to claim 1, further comprising forming a protection layer containing an insulation material at least between the split electrodes.

* * * * *